C. HARLAN.
Fertilizer Distributors.
No. 156,790. Patented Nov. 10, 1874.
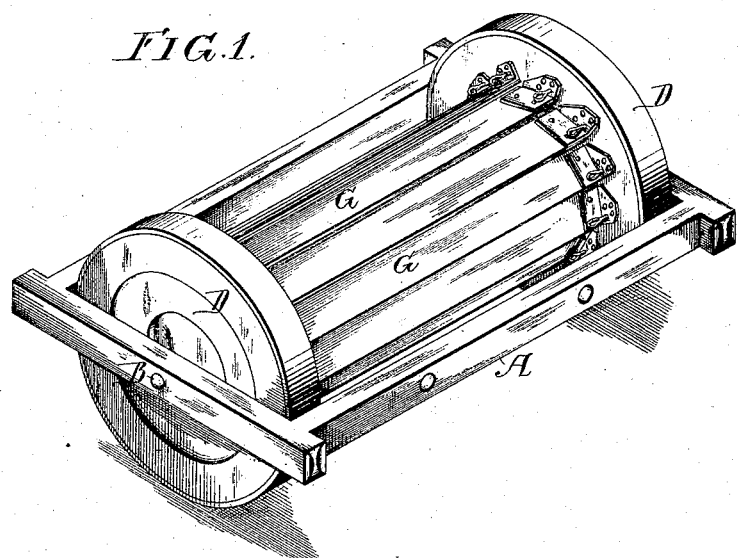
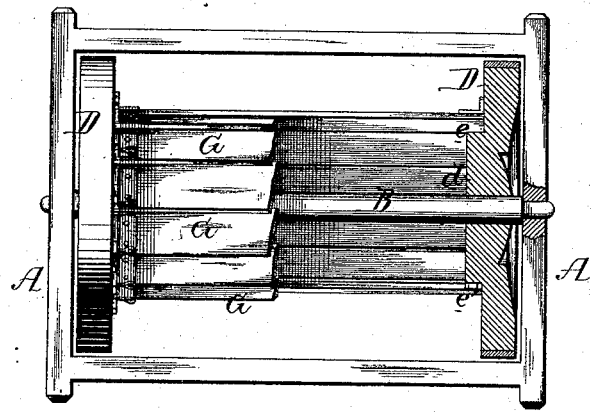
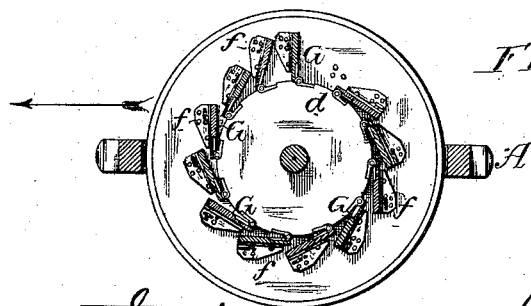

UNITED STATES PATENT OFFICE.

CALEB HARLAN, OF WILMINGTON, DELAWARE.

IMPROVEMENT IN FERTILIZER-DISTRIBUTERS.

Specification forming part of Letters Patent No. 156,790, dated November 10, 1874; application filed October 15, 1874.

*To all whom it may concern:*

Be it known that I, CALEB HARLAN, M. D., of Wilmington, New Castle county, State of Delaware, have invented an Improvement in Machines for Spreading Fertilizers, of which the following is a specification:

The object of my invention is to spread fertilizers evenly over the surface of the ground by means of a machine consisting of the combination of the shaft or axle B, wheels D, and adjustable overlapping vanes G, as illustrated in the accompanying drawing, in which—

Figure 1 is a perspective view of the machine; Fig. 2, a plan view, partly in section; and Fig. 3, a transverse section.

A is a frame, having shafts or a pole, by which the machine is drawn over the ground, and in this frame turn the journals of a shaft, B, to which are secured the two disks or wheels D D, and on the inside of each wheel is a circular projection, d, forming a shoulder, e, to which are hinged the vanes G, each of the latter consisting of a strip of wood or metal, extending from one wheel D to the other.

Ordinary hinges, as shown in Fig. 3, may be used for connecting the ends of the vanes to the shoulder e of the wheel, one leaf of each hinge being secured to the said shoulder and the other to the vane.

All the vanes are of the same width throughout, and are so arranged that the front edge of each vane shall overlap the rear edge of the adjoining vane, the said rear edge being in contact, or nearly so, with the shoulder e.

The openings between the vanes may be increased or diminished in accordance with the desired quantity of the fertilizer to be deposited on the ground, and the vanes may be retained in the positions to which they have been adjusted by pins passed through plates f into openings in the wheels, one of these plates being attached to each end of each vane.

As the machine is drawn over the ground in the direction of the arrow, the fertilizing material will be deposited evenly on the surface of the soil, in quantity commensurate with the extent of the openings between the vanes.

When the space bounded by the overlapping vanes has to be replenished with a fresh supply of the fertilizer, one of the vanes may be thrown back, as shown in Fig. 3, thereby presenting a sufficient opening for the admission of the said fertilizer.

I claim as my invention—

The combination of the shaft or axle B, adapted to bearings in a suitable frame, the wheels D D, and overlapping adjustable vanes G, hinged to the said wheels, all substantially as set forth.

In testimony whereof I have signed my name to this specification in the presence of two subscribing witnesses.

CALEB HARLAN, M. D.

Witnesses:
A. P. RUTHERFORD,
HARRY SMITH.